United States Patent [19]
Fletcher et al.

[11] 3,893,573
[45] July 8, 1975

[54] VARIABLE RATIO MIXED-MODE BILATERAL MASTER-SLAVE CONTROL SYSTEM FOR SHUTTLE REMOTE MANIPULATOR SYSTEM

[76] Inventors: James C. Fletcher, Deputy Administrator of the National Aeronautics and Space Administration, with respect to an invention of Fredrick J. Greeb; Shepard B. Brodie, both of Denver, Colo.; Carl R. Flatau, Shoreham, N.Y.

[22] Filed: Aug. 20, 1973

[21] Appl. No.: 389,916

[52] U.S. Cl. ............................................. 214/1 CM
[51] Int. Cl. ............................................. B25j 3/00
[58] Field of Search ............................... 214/1 CM

[56] References Cited
UNITED STATES PATENTS

| | | | |
|---|---|---|---|
| 3,065,863 | 11/1962 | Saunders, Jr. | 214/1 CM |
| 3,241,687 | 3/1966 | Orloff | 214/1 CM |
| 3,414,136 | 12/1968 | Moore et al. | 214/1 CM |
| 3,422,965 | 1/1969 | Lloyd | 214/1 CM |
| 3,451,224 | 6/1969 | Colechia et al. | 214/1 CM |
| 3,630,389 | 12/1971 | Schmidt | 214/1 CM |

*Primary Examiner*—Robert J. Spar
*Assistant Examiner*—Lawrence J. Oresky
*Attorney, Agent, or Firm*—Russell E. Schlorff; Marvin F. Matthews; John R. Manning

[57] ABSTRACT

A control system for a remotely operated manipulator system which incorporates a slave arm of substantial length and strength having multiple degrees of freedom at an adequate number of joints to enable the arm to accomplish specified tasks, and a master arm for use by an operator, the two being operated by a servo system which provides a variable ratio which is varied dependent on the task required for the slave arm. Gross movements of the slave arm are readily accomplished with small movements of the master. When the manipulator arm is close to the target, the ratio is preferably changed providing better master-arm response to the operator to enable grasping with the manipulator terminal device.

18 Claims, 11 Drawing Figures

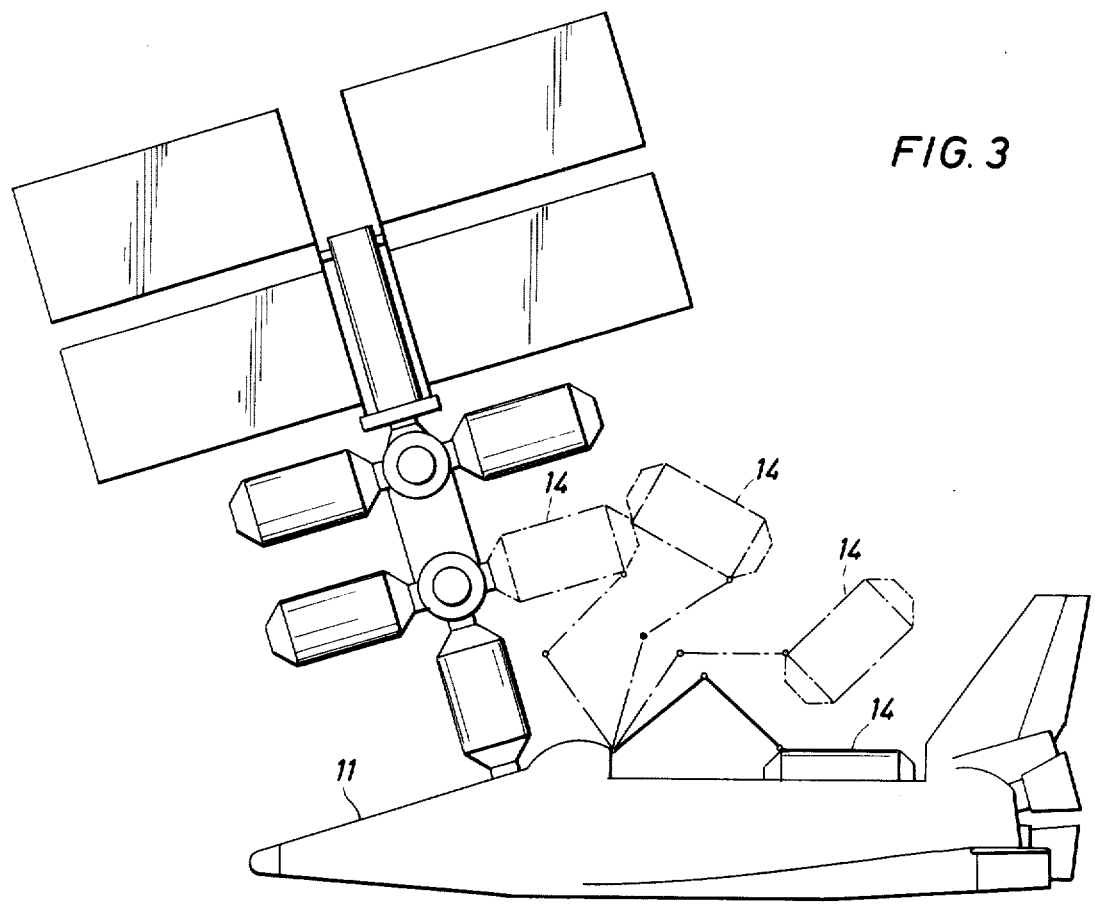
FIG. 3
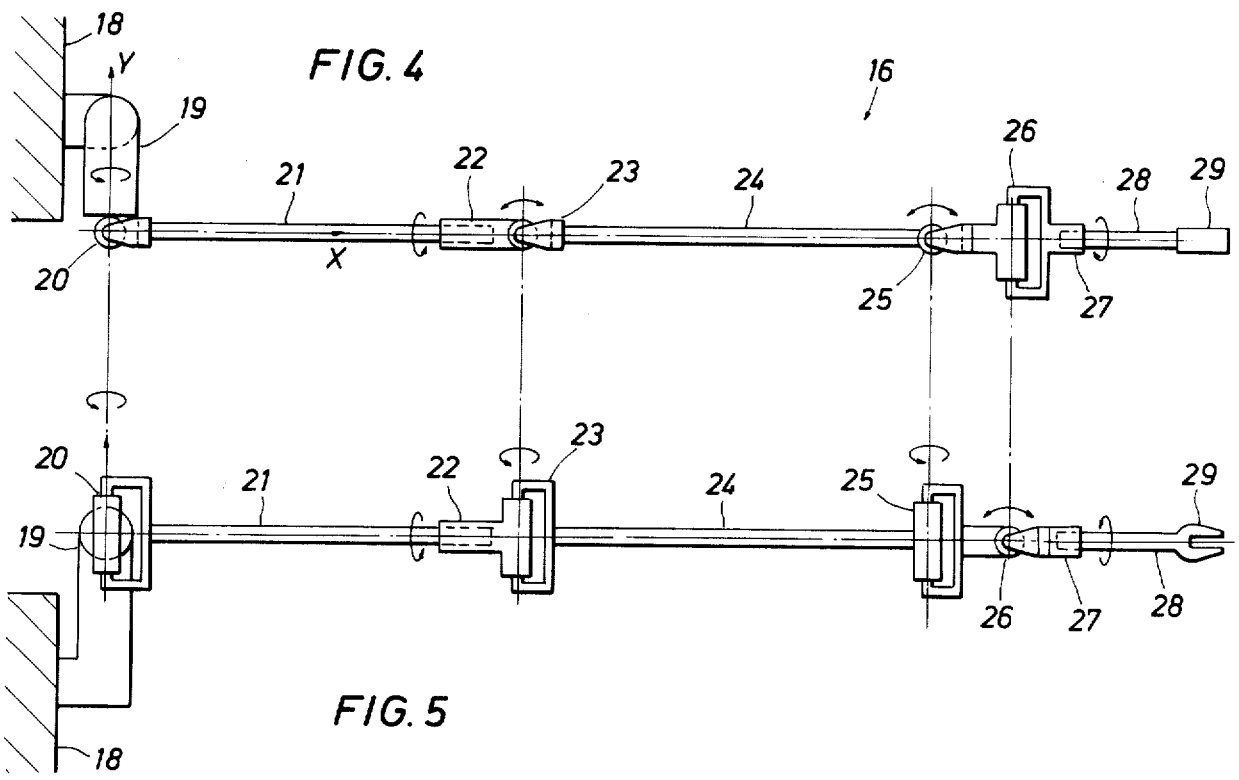
FIG. 4
FIG. 5

3,893,573

VARIABLE RATIO MIXED-MODE BILATERAL MASTER-SLAVE CONTROL SYSTEM FOR SHUTTLE REMOTE MANIPULATOR SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

| Prior Art | |
| --- | --- |
| 3,703,968 | 3,589,134 |

BACKGROUND OF THE INVENTION

In the use of remote manipulator arms, the normal application contemplates deployment of the arm to accomplish or achieve tasks where human intervention or agency is impossible. Arms can be provided with a variety of sizes, shapes and strengths to accomplish various tasks. In some circumstances, a remote manipulator arm is required to accomplish only a few tasks where the manipulation of the arm can be pre-programmed. Other circumstances require tasks of the manipulator arm which are widely varied, requiring an operator for manipulation. The use of a master-slave arrangement driven by appropriately connected servo systems has been considered in the past, but problems have arisen in implementation of mixed-mode master-slave control systems.

The present invention is directed to an apparatus which overcomes these obstacles, and many others. The apparatus provides a master-slave manipulator arm arrangement where the arms differ in size by a ratio of about eighteen-to-one. With a variable ratio capability, certain tasks for the manipulator arm are achieved using a one-to-one ratio for all angular displacements while at other times the displacement ratio can be set to one-to-eighteen. This enables the system to accomplish gross movements of the slave arm with small motion of the master arm, and yet provides necessary sensitivity for delicate maneuvers.

SUMMARY OF THE INVENTION

The present invention is a remote manipulator system which incorporates an arm having shoulder, elbow and wrist capabilities to provide preferably seven degrees of freedom to move a terminal device of requisite design in response to control of a master arm made available for a human operator. The master and slave have a variable ratio for transfer of motion of the master to the slave so that gross movements of the manipulated slave arm are accomplished with relatively small motion of the master arm while more delicate movements are achieved with greater movement, thereby enabling more sensitive control of the slave arm.

DESCRIPTION OF THE DRAWINGS

FIG. 3 is an alternative task shown schematically for the apparatus of the present invention;

FIG. 4 is a plan view of the remote arm of the present invention;

FIG. 5 is a front view of the arm shown in FIG. 4;

DESCRIPTION OF THE PREFERRED EMBODIMENT

Figure 1:
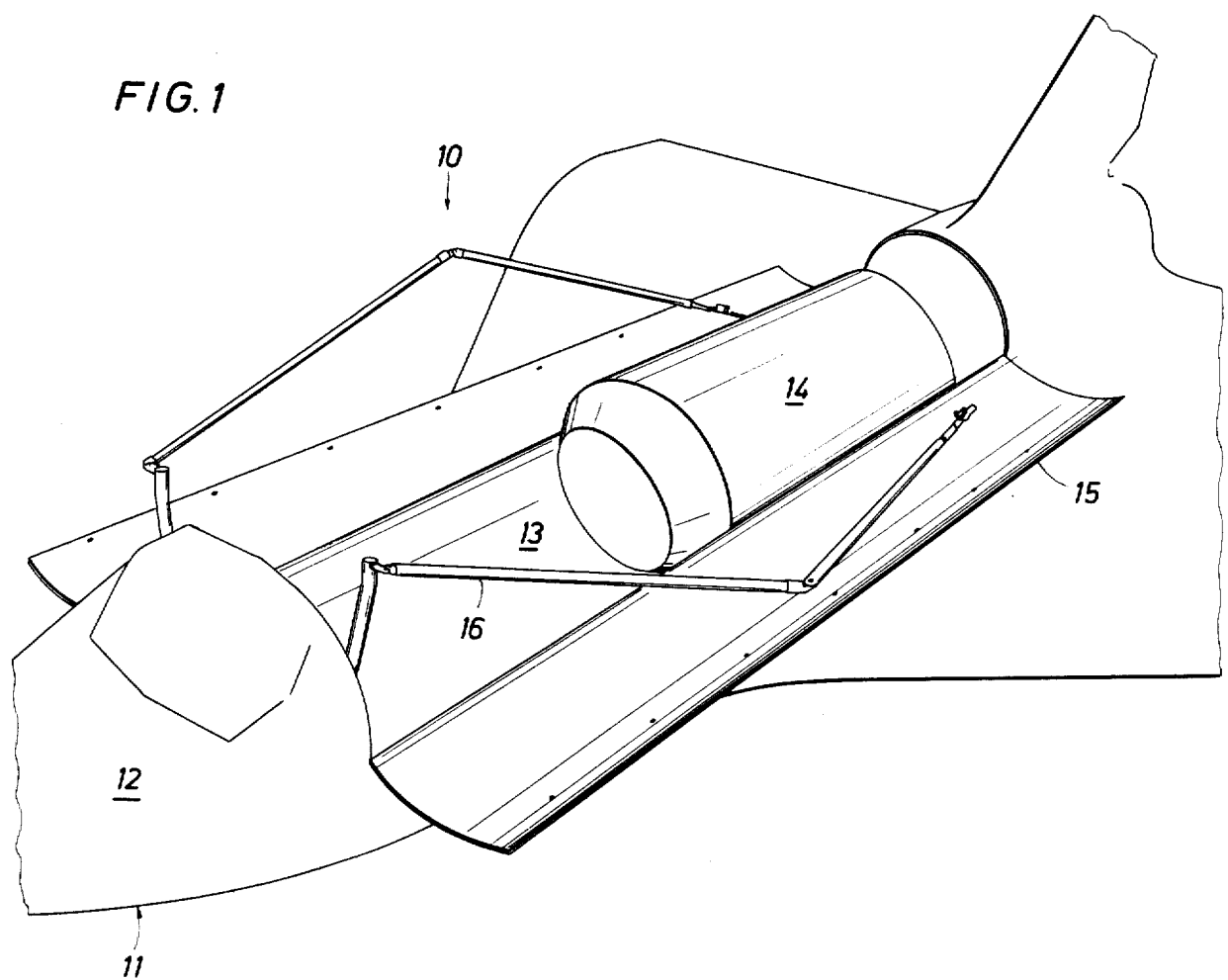
FIG. 1 is a view of a spacecraft having remote manipulator system arms installed for accomplishing various physical tasks on the exterior of the spacecraft.

Attention is first directed to FIG. 1 where a remotely located manipulator system 10 as might be installed on a spacecraft 11 is shown. The spacecraft 11 has a cabin 12 where the crew is located. The crew is provided with the master arm, as will be described. The spacecraft 11 has a cargo area 13 and carries a payload 14, the precise nature of which is not significant for this description. The payload 14 is located in the cargo area 13 which is selectively opened and closed by a set of bay doors 15. When the doors are opened, the cargo is exposed for manipulation by the remote manipulator arm 16 shown in FIG. 1. Preferably, two arms are provided and function in like manner, differing only in symmetrical positioning and geometry.

Figure 2:
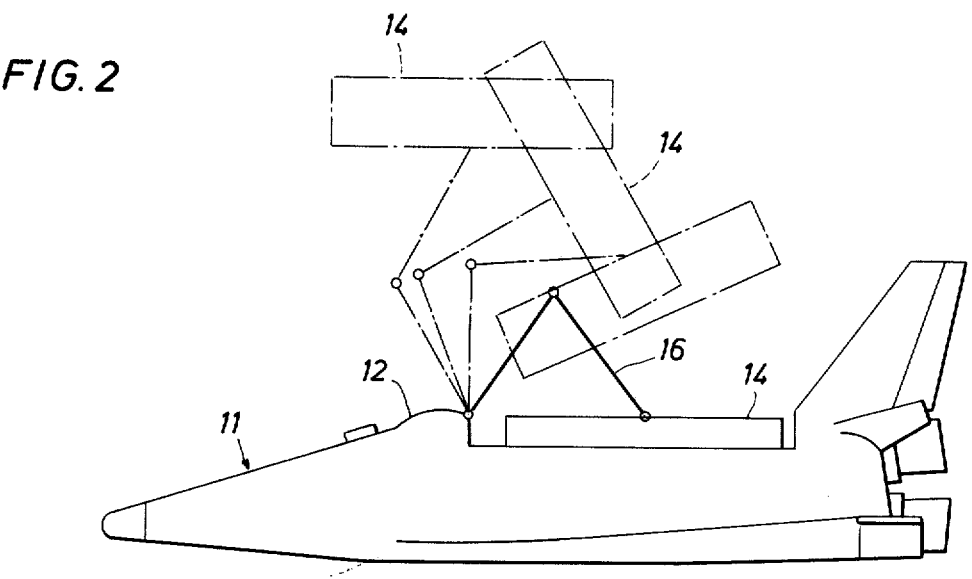
FIG. 2 is a schematic view of one maneuver to be accomplished by a remote manipulator system.

As shown in the schematic view of FIG. 2, the payload 14 is moved by the remote arms 16 from the full line position to various intermediate positions where they are extended from the spacecraft 11 to a space station. Movement may require transfer of the payload 14 from deep within the bay gently outwardly, avoiding all contact with the spacecraft bay doors 15 and other superstructure. The maneuver of the payload 14 from the sheltered position within the cargo area 13 to a point remote from the spacecraft 11 can only be accomplished with a great deal of difficulty in view of the circumstances.

In FIG. 3, the transfer of the payload 14 may be from a remotely situated space station to the spacecraft 11 which functions something as a shuttle. In this instance, the route of the payload 14 may be varied, but is at least opposite to that shown in FIG. 2. The payload 14 may be the most readily accessible, or the most remote payload attached to the space station.

FIGS. 4 and 5 are to be considered jointly, and represent the remote manipulator arm 16 of the present invention. The arm 16 is shown in the straight or extended position. A fixed structural bulkhead 18 on the spacecraft 11 supports the arm on a brace. The arm incorporates what will be described as a shoulder having two degrees of freedom. A first joint 19 provides rotation along the pitch axis. A second joint 20 provides rotation around the yaw axis. A boom 21 extends from the yaw joint toward the elbow. The elbow is also comprised of two joints, permitting two degrees of freedom.

A roll joint 22 is immediately connected to a yaw joint 23. Another boom 24 extends a substantial distance from the yaw joint 23 to an additional yaw joint 25 which comprises a portion of the wrist. The yaw joint 25 then connects immediately to a pitch joint 26 and then to a roll joint 27. The roll joint 27 is connected to a short boom 28 which then terminates at a terminal device 29 which is constructed and arranged to engage, grasp and lock to the payload 14 in a selectively controlled manner. The booms 21 and 24 provide substantial length to the arms 16 while the boom 28 is relatively short. The total length can be very substantial, even as much as twenty meters.

Figure 6:
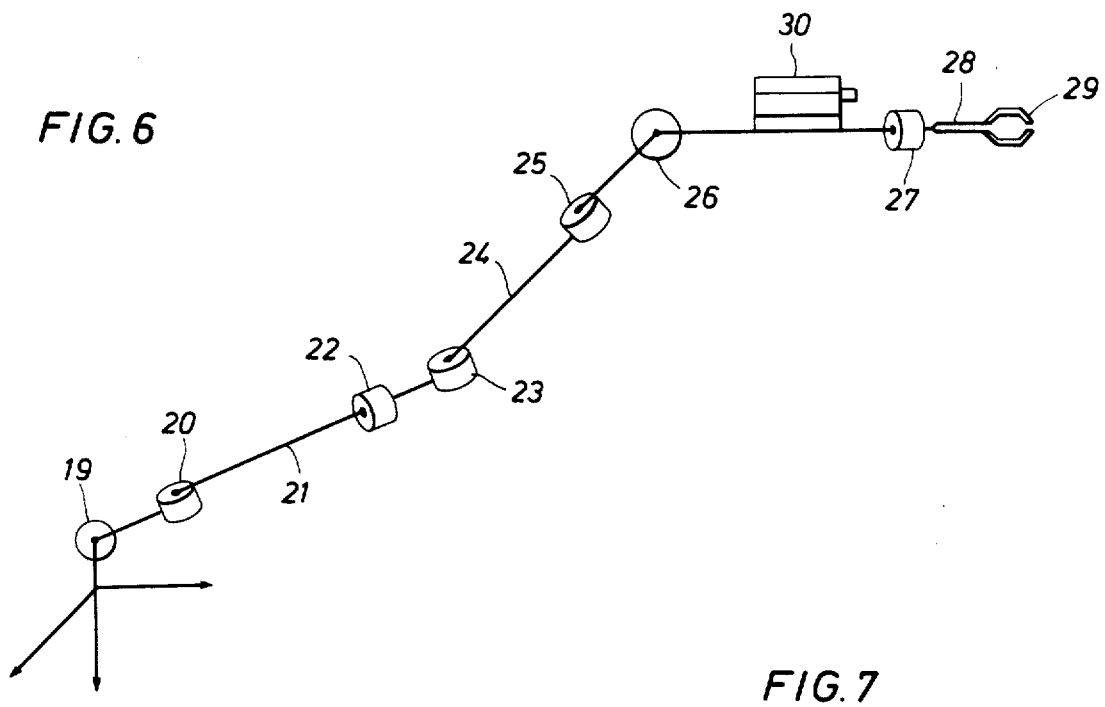
FIG. 6 is a schematic view of the remote arm showing the sequence of joints and the preferred location of a television camera which provides signals to the operator.

FIG. 6 enhances FIG. 5 in that it incorporates a television camera 30 between the wrist pitch joint 26 and roll joint 27. The several joints are represented schematically. The television camera 30 is located so that the terminal device 29 can be viewed during engagement and disengagement with the payload 14 or some other object to be engaged by the terminal device.

Figure 7:
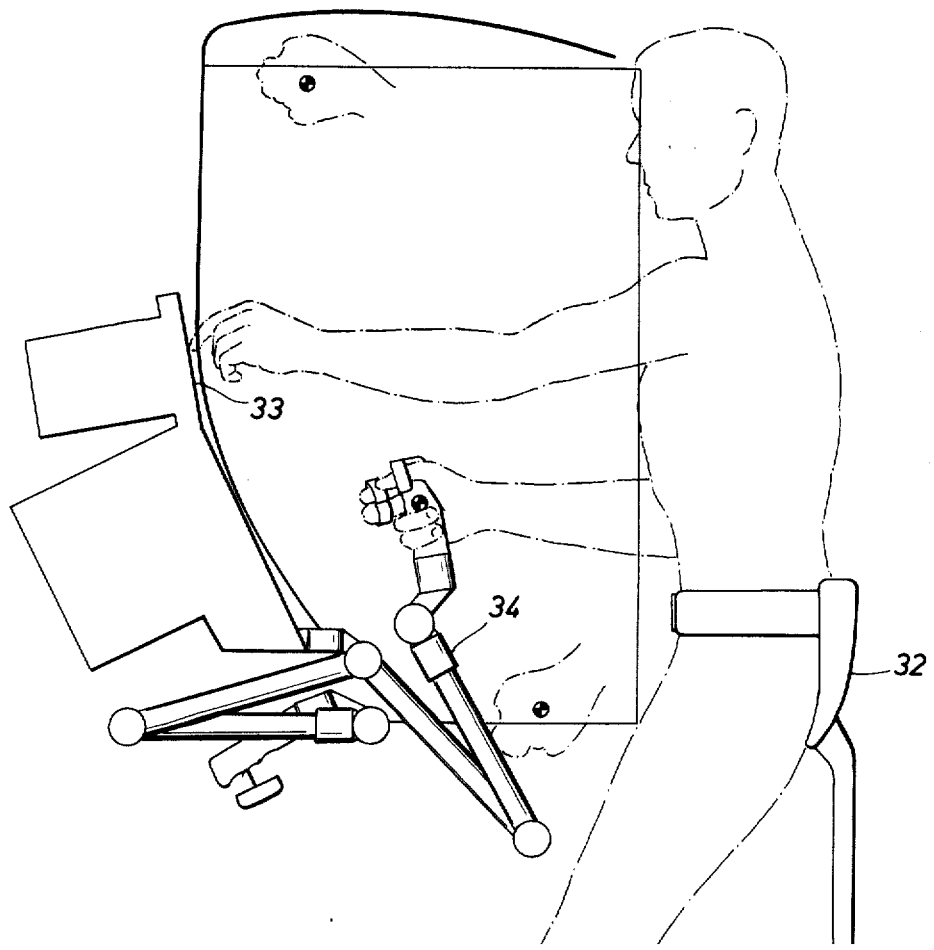
FIG. 7 shows the master arm and operator.

In FIG. 7, a crew compartment 12 includes sufficient room for an operator. The work station incorporates a seat 32, control panel 33, and master arm 34 for manipulation of the remote arm 16. In the preferred installation, two arms are incorporated as shown in FIG. 1. Two master arms are installed as shown in FIG. 7. Inasmuch as the remote arms are similar, differing only in position but being symmetrical in other regards, a description of only one is believed sufficient for the present disclosure. Only one master arm will be described. A left master arm is illustrated in a stowed position. The right arm is being manipulated by the operator as shown in FIG. 7. A clearance line for the master arm 34 limits deflection. The master arm can be swept to and fro within the sweep of the clearance line to thereby create control signals for manipulation of the remote arm 16. More will be noted concerning this hereinafter.

Figure 8:
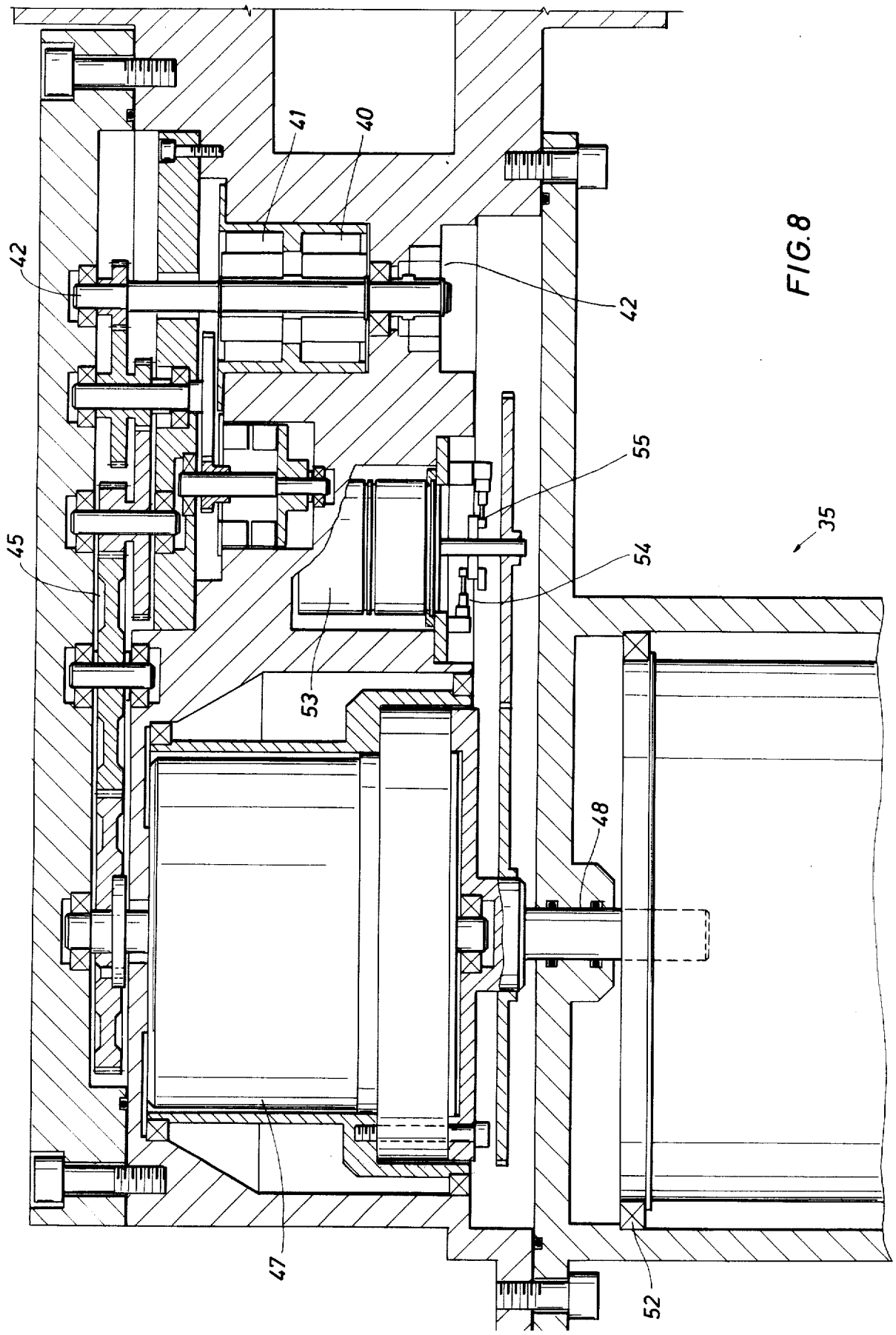
FIG. 8 is a sectional view through a typical pitch joint assembly for use in the arm as might be required at the shoulder.
Figure 9:
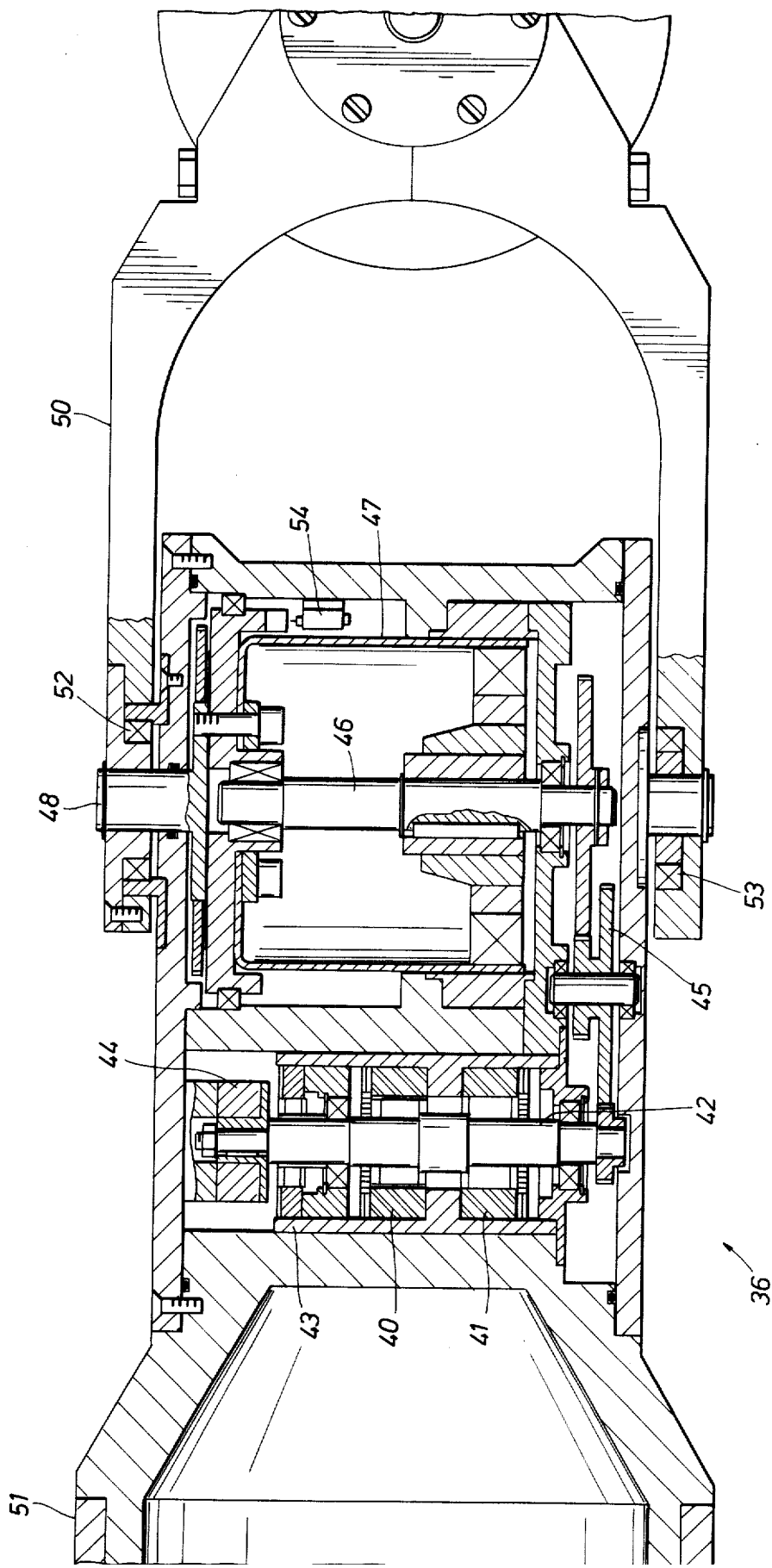
FIG. 9 is a sectional view through a typical yaw joint assembly as might be required at the wrist of the arm.
Figure 10:
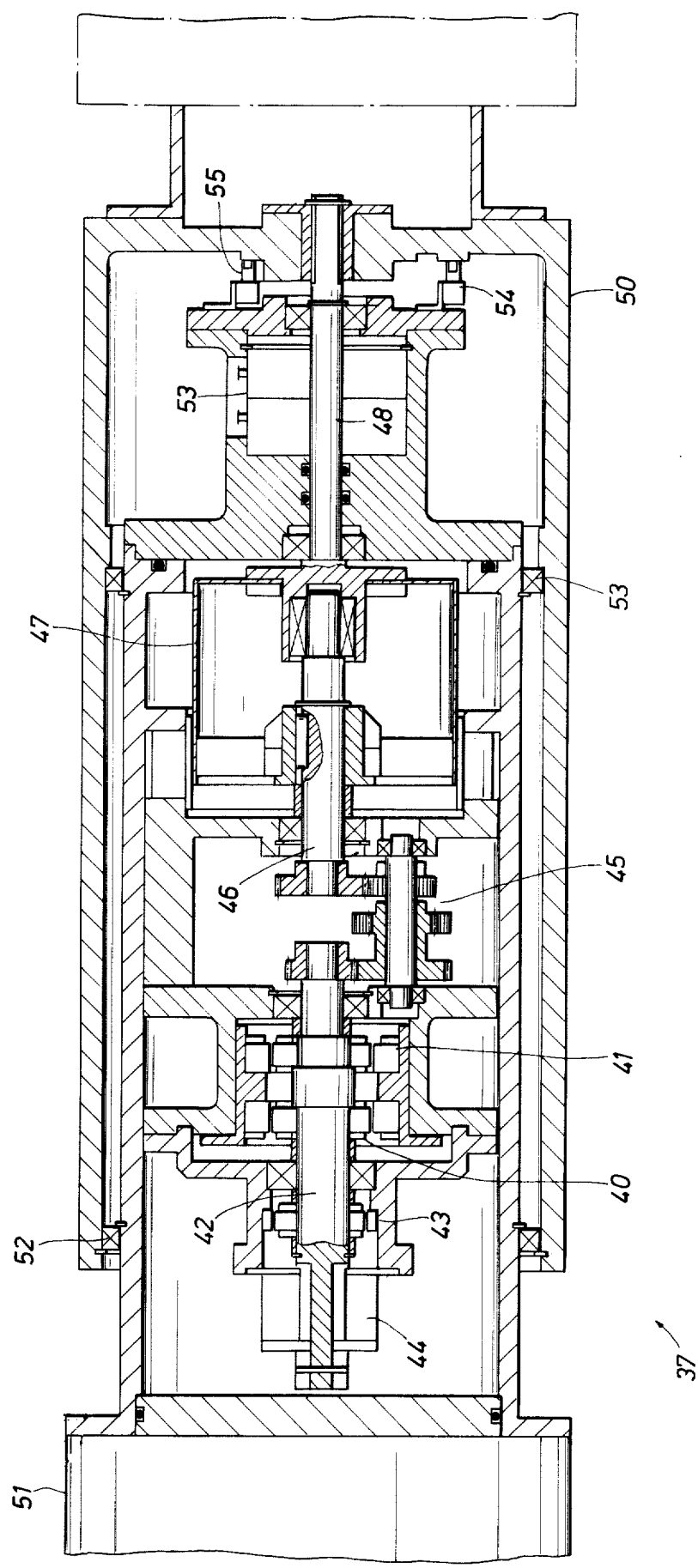
FIG. 10 is a sectional view through a typical roll joint assembly as might be required at the wrist; and, FIG. 11 is a schematic block diagram of the control system for the manipulator arm of the present invention.

FIG. 8 illustrates a pitch joint assembly 35. FIG. 9 discloses a yaw joint assembly 36. FIG. 10 is a roll joint assembly 37. Similar reference numerals will be used for the various components of FIGS. 8, 9 and 10 inasmuch as they incorporate substantially the same components, differing only in orientation with respect to the three axes and the fixed and movable members which connect to the joint assemblies. FIG. 10 incorporates a pair of motors 40 and 41. One is redundant in the event of failure. The motors 40 and 41 drive a shaft 42 which connects through a tachometer generator 43 to a dynamic brake 44. The brake 44 preferably provides a lock on continued motion in the event of failure, and can be controlled to terminate motion and provide holding on the shaft 42 after the motor has been operated during various maneuvers.

The shaft 42 connects to a gear train 45 which provides a step-down ratio appropriately selected for the required torque. The gear train 45 drives a shaft 46 which is connected to a harmonic drive mechanism 47. The drive mechanism 47 provides further step-down and additional torque. Its output is on a shaft 48 which connects with an output hub or housing 50. The harmonic drive mechanism 47 is fixed with respect to the portion 51 of the arm which is to the left of FIG. 10. It is relatively fixed insofar as the description of FIG. 10 is concerned. When the motors 40 and 41 are operated, the harmonic drive mechanism 47 rotates the shaft 48 which in turn is fixed to and rotates a surrounding hub or housing 50. The hub or housing 50 is secured relative to the fixed portion 51 by means of widely spaced bearings 52 and 53. The bearing assemblies align the hub 50 for rotation about the center line axis through the shaft 48. The extent of rotation is determined by a potentiometer 53. Limit switches are included at 54 and 55. It is not necessary for the roll joint assembly 37 shown in FIG. 10 to rotate continuously through 360°. Some range of rotation can be specified. Something just over 180° is normally adequate, under the assumption that the terminal device achieves a prehensile grip with symmetrically constructed halves. The various joint assemblies shown in FIGS. 8, 9 and 10 are similar in that they incorporate limit switches which provide override signals. Tachomter generators are included which provide rate control signals. Potentiometers are also included which provide position signals.

Figure 11:
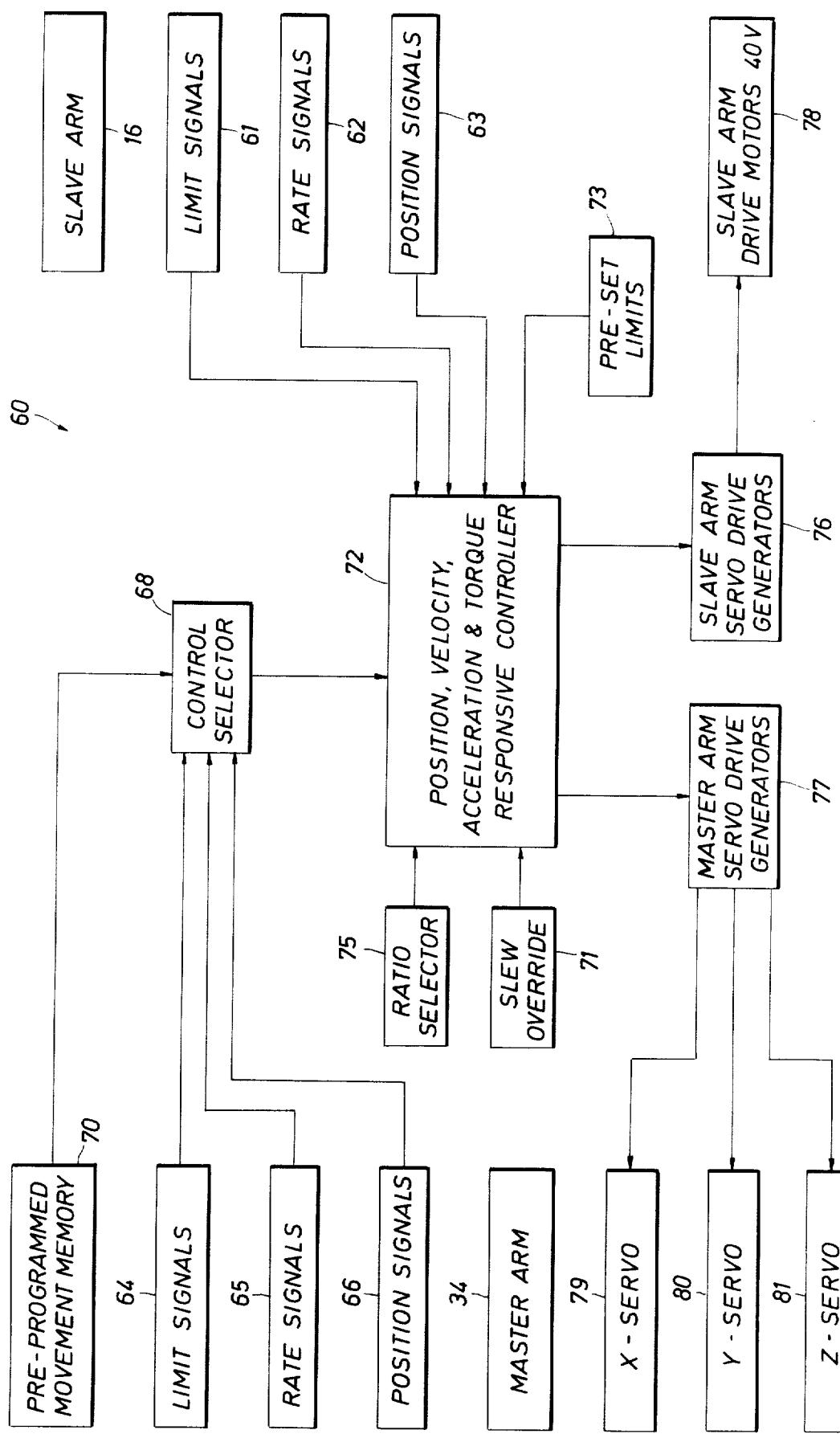

FIG. 11 illustrates a schematic block diagram of the controller of the present inventioon. The controller is generally indicated at 60. Beginning with some of the known inputs, the numeral 61 indicates the limit switches which are located on the slave arm at the various joints. These are illustrated in FIGS. 8, 9 and 10. They provide limit signals indicating travel to limits which override operation, interrupting continued travel of the joints and terminating operation of the drive motors 40 or 41 at that particular joint. The limit switches provide override signals. The numeral 62 indentifies the rate signals which are generated by the tachometers shown in FIGS. 8, 9 and 10. The rate signals indicate the rate of motion of the various joints during rotation or translation. The joints also incorporate potentiometers which are shown in FIG. 11 at 63 which form position signals. The position signals indicate the extent of deflection at any point in time. These signals are also utilized in the control system as will be described.

The master arm 34 is also included in FIG. 11. It incorporates signal generating apparatus of the same sort depicted in FIGS. 8, 9 and 10. It generates limit signals as indicated at 64. These are generated to prevent travel beyond the indicated envelope shown in FIG. 7. The rate of movement of the master arm under control of the operator is indicated by the rate signals at 65. The position of the master arm is also indicated by the signals at 66. The signal sources 64, 65 and 66 serve as one set of inputs for a control selector 68. The control selector is provided with alternate sets of control signals. One set is provided from the master arm 34 and another set is provided from a pre-programmed movement memory 70. The memory 70 stores several of the most utilized movement patterns. Movement from the stored position with the bay doors 15 to a position engaging the payload 14 as illustrated in FIG. 1 is a very predictable pattern of movement which can be stored in memory at 70. This pattern is likely to be repeated in many uses of the equipment.

A slew override switch 71 is likewise provided. It forms a signal to enable repositioning of the master control arm 34. The operator, during a period of manipulation, may maneuver the master arm 34 to a high position interfering with his line of vision. When this happens, the slew override 71 can be actuated to enable the arm 34 to be restored to a lower, more convenient position such as that illustrated in FIG. 7. When it is moved in this mode of operation, the slew override switch 71 is operated, preventing formation of signals for the controllers 60 shown in FIG. 11. This movement is intended for convenience and facility of the operator, but is not intended to form or generate control signals. The slew override 71 is operated to negate the limit, rate and position signals formed by the means 64, 65 and 66.

The control selector is provided with two types of inputs. One set of inputs is from the memory 70 while the other is from the master arm. One set of inputs is selected by the selector 68 and is next input to a controller 72.

The controller 72 is provided with inputs from the slave arm 16 and the master arm 34. The master arm 34 is manipulated and signals are provided to the controller. The controller takes the signals resulting from master arm manipulation and converts them into signals for manipulation of the slave arm, taking into view the then existent condition of the slave arm. The condition of the slave arm will include the location with respect to limit switches, its actual position short of actuation of limit switches, and its rate of movement of the instant. Once provided with the position and rate of movement, the new position to be achieved is readily calculated. Acceleration is the first derivative of the rate signal. The derivative is calculated and tested to avoid exceeding preset limits from the means 73. The preset limits are input at 73. A positional preset limit may be input to prevent the manipulator arm 16 from striking the ship or some optionally erected exterior device such as a reflector dish for an antenna system. The apparatus may include a reflector dish for a microwave antenna system for communication from the spacecraft 11. The antenna may not be erected at the time of launch, but may be erected in space. A similar type of device which might be erected in space is a panel of thermal converters for generating electricity. When they are erected, the positional designation of such obstacles for the slave arm 16 is input to prevent the manipulator arm from accidently striking them. Limits may also exist on the manipulator arm with regard to torque or load on the arm, rate of acceleration, or rate of velocity. All of these limits are input to the system 60 at the preset limits 73.

The controller 72 is also provided with a ratio selector input 75 which is particularly advantageous in changing the ratio of movement insofar as linear movement or angular deflection is concerned between movements of the arm 16 and master arm 34. Typical ratios range from one-to-one for careful movements to a ratio corresponding to the ratio in actual links between the two arms. If the two arms differ by a ratio of 10, the ratio selector is preferably provided with a selection of 10. In the fine manipulation mode of operation, the ratio selector 75 is switched to the ratio approximately corresponding to the relative length of the two arms which, in effect, requires an increased movement of the master arm to achieve movement of the slave arm. Assume for purposes of discussion that the ratio of the two arms is eighteen-to-one, which is a fairly convenient ratio for an arm approximating fifteen meters in length. The master arm is of a convenient length to fit within the spacecraft cabin 12. If it were smaller, it would be too sensitive to slight movements, and if it were longer, it would be too cumbersome for operation within the confined cabin. If the ratio is about eighteen-to-one, the coarse mode of operation results in movement at the slave arm larger by the ratio of the movement of the master arm. In the altered ratio mode of operation, the slave arm 16 is moved in a ratio of one-to-one. This enables the operator to have fine control for termination of jobs.

The controller 72 is responsive to position, velocity, acceleration and torque, and forms controlling signals for slave arm servo driver generators at 76 and similar generators for the master arm at 77. The servo drive mechanisms at 76 are connected to the motors at 78. The motors are shown at 40 and 41 in FIGS. 8, 9 and 10. The master arm is also moved by X, Y and Z servo drive motors 79, 80 and 81. This movement carries the master arm in response to the actual movement of the slave arm 16. This movement is accomplished notwithstanding the force applied by the hand of the operator. The operator is provided with "feel" enabling him to use a delicate touch in controlling the master arm. The movement of the master arm 34 resulting from the servo drive motors 79, 80 and 81 repositions the master arm. Inasmuch as a closed loop servo system is described herein, it is understood that the control manipulations resulting from the servo drive motors 79, 80 and 81 are subject to defeat or alteration by continued manipulation of the master arm by the operator which is sensed by the equipment cooperative with the master arm and the limit signals 64, rate signals 65, and position signals 66 provide a continuous driving input for the servo system.

In operation, the control system 60 is advantageous in the variety of movements which can be achieved through the control selector 68. Repetitive movements are stored in memory at 70 and can be readily implemented by switching to memory for this mode of operation. Movements requiring other skills can be achieved by hand through the master arm 34. Even this is provided with the advantage of a change in the ratio between the master arm and the slave arm. The signals from the master arm have one control ratio for coarse movements, and another control ratio for fine movements.

If desired, intermediate ratios can be implemented with the ratio selector. Intermediate ratios may serve for intermediate tasks. If the slave arm 16 is to be deflected ten meters, the first five or six meters of deflection can be achieved with a coarse ratio selector. The next two or three meters of deflection can be achieved with an intermediate ratio. The last few meters and centimeters of movement can be achieved with movement of the master arm 34 corresponding to movement of the slave arm on a one-to-one ratio. Preferably the television camera 30 previously mentioned provides a closed circuit view for the operator at his control panel 33 as shown in FIG. 7.

The foregoing is directed to the preferred embodiment of the present invention, the scope of which is determined by the appended claims.

We claim:
1. A remote manipulator system comprising
   an articulated slave arm adapted to be fixedly attached for extension;
   a master arm adapted to be manipulated by a user in a manner to impart movement to said slave arm; said slave arm and said master arm each being made up of a plurality of pivotally connected, constant length segments, the length of the segments of the slave arm to those of the master arm being a fixed ratio;

a control system connected between said master and said slave arms, said control system imparting movement to said slave arm at least partly in accordance with manipulation of said master arm, said control system at least enabling said slave arm to exercise two degrees of freedom, said control system including a controller receiving signals resulting from master arm manipulation and converting said signals from the master arm into signals for manipulation of the slave arm, means for providing different ratio of movement between said master arm and slave arms, and, means for selecting between different ratios, whereby in a coarse mode of operation, movement of the slave arm to the master arm is at a ratio of the length of slave arm to the master arm and in fine mode movement of the slave arm to the master arm is by a ratio of one-to-one.

2. The apparatus of claim 1 wherein the ratios of movement apply to angular deflection.

3. The apparatus of claim 1 including yaw, roll and pitch joints in said slave arm.

4. The apparatus of claim 3 wherein said slave arm includes a motor driven at each of the joints.

5. The apparatus of claim 1 including X, Y and Z servo drive motors for deflecting said master arm in response to movement of said slave arm.

6. The apparatus of claim 1 including rate of movement sensors on said slave arm operable to form signals for said control system.

7. The apparatus of claim 1 including position sensors on said slave arm operable to form signals for said control system.

8. The apparatus of claim 1 including limit sensors on said slave arm operable to form signals for said control system.

9. The apparatus of claim 1 including first and second sensors on said master responsive to rate of movement and position, said sensors forming signals for said control system.

10. The apparatus of claim 9 including servo drive motors for moving said master arm.

11. The apparatus of claim 10 wherein said control system controls said servo drive motors.

12. The apparatus of claim 1 wherein one end of said slave arm is anchored and said arm includes a shoulder joint with at least two degrees of freedom.

13. The apparatus of claim 12 wherein said slave arm includes an elbow having at least two degrees of freedom.

14. The apparatus of claim 12 wherein said arm includes a wrist with at least two degrees of freedom.

15. The apparatus of claim 14 including a television system camera on said arm for viewing the outer portions thereof.

16. The apparatus of claim 1 including first and second articulated portions in said slave arm terminating in a terminal device, said arm portions being selectively joined by joint means which all have at least two degrees of freedom, and said control system includes a servo loop incorporating a servo drive motor at each joint means and sensor means for detecting deflection thereof.

17. The apparatus specified in claim 1, including means to reposition the master arm without movement of the slave arm.

18. The apparatus specified in claim 1, including means to automatically move the slave arm to perform preselected tasks.

* * * * *